United States Patent [19]

Göldner et al.

[11] Patent Number: 5,721,018

[45] Date of Patent: Feb. 24, 1998

[54] METHOD FOR PRODUCING MULTILAYER COATINGS

[75] Inventors: Wolfgang Göldner, Heiligenhaus; Werner Lenhard, Wuppertal; Albrecht Lüttenberg, Wuppertal; Hans-Peter Patzschke, Wuppertal, all of Germany

[73] Assignee: Herberts Gesellschaft mit beschrankter Haftung, Wuppertal, Germany

[21] Appl. No.: 639,874

[22] Filed: Apr. 26, 1996

Related U.S. Application Data

[63] Continuation of Ser. No. 379,116, Jan. 27, 1995, abandoned, which is a continuation of Ser. No. 7,358, Jan. 21, 1993, abandoned, which is a continuation of Ser. No. 893,567, Jun. 3, 1992, abandoned, which is a continuation of Ser. No. 681,954, Apr. 8, 1991, abandoned.

[30] Foreign Application Priority Data

Apr. 11, 1990 [DE] Germany .......................... 40 11 633.6

[51] Int. Cl.$^6$ .................. B05D 1/36; B05D 3/02; B05D 7/00
[52] U.S. Cl. .................. 427/407.1; 427/140; 427/442.1
[58] Field of Search ................ 427/140, 407.1, 427/412.1, 412.3, 420, 421, 429

[56] References Cited

U.S. PATENT DOCUMENTS

| | | | |
|---|---|---|---|
| 3,988,281 | 10/1976 | Minami et al. | 260/29.6 TA |
| 4,066,591 | 1/1978 | Scriven et al. | 260/29.2 TN |
| 4,182,828 | 1/1980 | Reischl et al. | 528/69 |
| 4,322,325 | 3/1982 | Esser et al. | 427/407.1 |
| 4,489,135 | 12/1984 | Drexler et al. | 427/407.1 |
| 4,719,132 | 1/1988 | Porter, Jr. | 427/407.1 |
| 4,761,212 | 8/1988 | Watanabe | 427/407.1 |
| 4,789,566 | 12/1988 | Tatsuno et al. | 427/407.1 |
| 4,791,168 | 12/1988 | Salatin et al. | 427/412.1 |
| 4,846,946 | 7/1989 | Mauer et al. | 427/407.1 |
| 4,857,580 | 8/1989 | Patzschke et al. | 524/507 |
| 4,909,915 | 3/1990 | Bederke et al. | 427/487 |
| 4,978,708 | 12/1990 | Fowler et al. | 427/407.1 |
| 5,047,294 | 9/1991 | Schwab et al. | 427/407.1 |

FOREIGN PATENT DOCUMENTS 2013373  10/1990  Canada.

*Primary Examiner*—Diana Dudash
*Attorney, Agent, or Firm*—Schweitzer Cornman Gross & Bondell LLP

[57] ABSTRACT

A process for preparing a multi-layer coating on an electrically nonconductive surface of a substrate, which comprises (A) applying over the surface an aqueous dispersion having a pH of from 5 to 8 when not containing a metallic pigment, the dispersion containing of from 15% to 20% wt. based on the dispersion of a base coat resin without metallic pigments then having a nonvolatile content of from about 30% to about 50% wt. based on the base coat resin of (i) from 75% to 98% wt. based on base coat resin solids of one or more partially or completely acid neutralized cationic, polyurethane, and polyurethane-urea resins, having a OH number of up to 450, and an amine number of from 20 to 200, and (ii) from 2% to 25% wt. based on base coat resin solids of one or more of an amine-formaldehyde condensation resin alone or in admixture with a blocked polyiisocyanate in either case having at least two groups per molecule being reactive with one or more of amino, OH$^-$, urethane, and urea groups in (i), the aqueous dispersion further containing one or more of a pigment, a filler, and a lacquer additive, and up to 15% wt. based on the dispersion of an organic solvent for said resin, the ratio of pigment and filler to the resin solids being 0.05–1.2:1, and (B) then applying a clear anionic lacquer coat in a solution in water or in an organic solvent of a clear lacquer powder, said base coat and said clear lacquer coat being cured together at a temperature below 160° C.

10 Claims, No Drawings

METHOD FOR PRODUCING MULTILAYER COATINGS

This is a continuing application of U.S. Ser. No. 08/379,116, filed on Jan. 27, 1995; which was a continuing application of U.S. Ser. No. 08/007,358, filed on Jan. 21, 1993; which was a continuing application of U.S. Ser. No. 07/893,567, filed on Jun. 3, 1992; which was a continuing application of U.S. Ser. No. 07/681,954, filed on Apr. 8, 1991, all now abandoned.

BACKGROUND AND SUMMARY OF THE INVENTION

For ecological reasons, the aim in the motor industry is a complete lacquered body using water-dilutable synthetic resins. In the case of modern lacquered bodies, the fillers or base coats are water-dilutable anionic resins, which are sprayed on in succession. Covering lacquers are frequently applied by the "base coat/clear coat" method, in which the two layers are usually cured in a combined stoving stage (wet-on-wet process). The process has become particularly important in the manufacture of ornamental metal lacquers, but has also been carried out in single shades.

The substances used for anti-corrosion primers are water-dilutable modified amino-epoxy resins which coagulate when a current is applied to the conductive substrate, which is connected as a cathode. In published German patent application No. 30 03 286 a conductive substrate connected as a cathode is coated with a synthetic resin layer containing a metal powder (aluminium powder). A transparent layer can then be applied wet-on-wet and the two layers can be cured together by storing, without intermediate drying. To obtain useful protection against corrosion, according to the examples, heating to 170° to 200° C. is necessary for about 15 to 25 minutes. The resulting base coats tend to turn yellow. No further details are given about the clear lacquer layer.

Published German patent applications No. 34 36 346, (U.S. Pat. No. 4,857,580) 36 28 119 and 36 28 122 U.S. Pat. No. 4,909,915 describe aqueous non-yellowing electrodeposition coating agents for producing primers or single-layer coatings, in which the basic resin comprises synthetic binders containing primary and/or secondary hydroxyl groups and primary, secondary and/or tertiary amino groups, e.g. amino-poly(meth)acrylate resins with a hydroxyl number of 80 to 250 (mg/KOH per g solid resin) and an average molecular weight (Mn) of 250 to 10000. To obtain optimum protection against corrosion, these resins are cured at 160° to 190° C. without applying a clear lacquer.

When the thickness of the layer increases, application of a cationic layer to a metal substrate by spraying or immersion has considerable disadvantages with regard to protection against corrosion. Electrophoretic deposition of the base coat is unsuccessful in the case of automotive painting on a non-conductive filler.

The object of the invention is to provide a method of producing multilayer coatings using aqueous base lacquers which can without difficulty be covered with aqueous or solvent-containing clear lacquers and can be cured to obtain a lacquered body with good optical properties and good resistance to moisture.

This problem is solved by a method of manufacturing a multilayer coating on an electrically non conductive surface of a substrate optionally provided with a conventional primer and optionally with a conventional filler, characterised by application of an aqueous base lacquer made from an aqueous dispersion containing covering transparent and/or decorative pigments and/or fillers optionally together with conventional lacquer additives and up to 15 wt. % of organic solvent relative to the applicable base lacquer, the dispersion containing A) 70 to 100 wt. % of a partly or completely acid-neutralised cationic poly(meth)acrytate, polyester, polyurethane and/or polyurethane-urea resin, having a number-average molecular weight (Mn) of 500 to 500000, an OH number of 0 to 450, an amine number of 20 to 200 and a glass transition temperature of −50° to +150° C., and B) 0 to 30wt. % of an amine-formaldehyde condensation resin and/or a blocked polyisocyanate, in each case with at least two groups per molecule reactive with regard to the amino and/or OH groups and/or urethane and/or urea groups in component A, the percentage weights of components A) and B) each being relative to solid resin and adding up to 100 wt. %, and the ratio of pigment and fillers to the sum of components A) and B) being 0.05–1.2 to 1 relative to the solids weight, and the total solids content of the base lacquer being 15 to 50 wt. %.

Next, in the method according to the invention, a clear lacquer based on solvent-containing or water-containing non-pigmented resins or a clear-lacquer powder is applied, the base lacquer and the clear lacquer being cured either separately or together, optionally after short intermediate drying, at temperatures below 160° C.

The component A) used in the base lacquer according to the invention is a poly(meth)acrylate, polyester, polyurethane and/or polyurethane-urea resin containing basic groups which when at least partly neutralised form ionic salts, e.g. cation-forming groups.

The poly(meth) acrylate resin containing basic groups in component A) is manufactured by solution polymerisation or emulsion polymerisation or copolymerisation and has a hydroxyl number of 0 to 450, preferably 30 to 200 mg KOH per g solid resin. The number-average molecular weight (Mn) is 500 to 50000, preferably 1000 to 10000 (measured by gel permeation chromatography calibrated with polystyrene fractions). its viscosity is preferably 0.1 to 10 Pa.s, more particularly 0.5 to 5 Pa.s in 50% solution in monoglycol ethers (more particularly butoxyethanol) at 25° C. Its glass transition temperature (calculated from the glass transition temperatures of the homopolymers) is between −50° and +150° C., preferably between −20° and +75° C. Suitable average molecular weights or viscosities can also be obtained by mixing resins of higher or lower molecular weight or viscosity. The amine number is between 20 and 200, preferably 30 to 150 and particularly preferably 45 to 100 (mg KOH per g solid resin).

The poly(meth)acrylate resins (component A) containing basic groups can be manufactured as in the prior art, as described e.g. in published German patent applications No. 15 46 854, (U.S. Pat. No. 3,458,420) 23 25 177 U.S. Pat. No. 3,988,281 or 23 57 152 (U.S. Pat. No. 4,164,488). Practically all radically (by radicals initiated) polymerisable monomers are suitable as ethylenically unsaturated monomers, subject to the normal limitations for copolymerisation given by the Q and e-scheme after Alfrey and Price or by the copolymerisation parameters (compare Brandrup and Immergut, Polymer Handbuch, 2nd edition, John Wiley and Sons, New York 1975). The basic poly(meth)acrylate resin can contain amino groups and also onium groups such as quaternary ammonium groups or sulphonium or phosphonium groups. Particular preference is given to amino groups which make the resin dilutable with water after neutralisation with organic acids. A copolymer of this kind, containing amino groups and hydroxyl groups, is obtained by polymerisation in solution or in emulsion. Solution polymerisation is preferred.

The poly(meth)acrylate resin in component A) is obtained from (meth) acrylate monomers, optionally together with other radically polymerisable monomers. Radically polymerisable monomers, i.e. (meth)acrylate monomers and/or other radically polymerisable monomers, are radically polymerisable amino-group containing monomers or radically polymerisable monomers containing amino and hydroxyl groups. They can be used mixed with other radically polymerisable monomers.

Operation is preferably as follows: 6 to 40 parts by weight of radically polymerisable amino group-containing monomers and 4 to 50 parts by weight of radically polymerisable hydroxyl group-containing monomers or 8 to 60 parts by weight of radically polymerisable hydroxy and amino group- containing monomers are used per 10 to 90 parts by weight of radically polymerisable monomers not containing other reactive groups. Preferably more than 50 wt. % and particularly preferably more than 70 wt. % of the radical polymerisable monomers used are (meth)acrylate monomers. These (meth) acrylate monomers can e.g. contain amino groups and/or hydroxyl groups via their ester group or can be additional non-functional monomers.

In the present description, "(meth)acrylate" means acrylate and/or methacrylate.

DETAILED DESCRIPTION OF PREFERRED EMBODIMENTS

In a preferred embodiment, out of the 10 to 90 parts by weight of radically polymerisable monomers not containing other reactive groups, 0.1 to 7 parts by weight can be replaced by ethylenically polyunsaturated monomers.

The monomers containing amino groups can e.g. be monomers having the general formula:

R—CH=CR'—X—A—N(R")$_2$ where

R=R' or —X—C$_n$H$_{2n+1}$,

R'=—H or —C$_n$H$_{2n+1}$ and

R"=—R', —C$_n$H$_{2n}$OH and/or —C$_n$H$_{2n}$NR$_2$,

R is defined as before, and

X=—COO—, —CONH—, —CH$_2$O— or —O—,

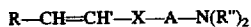

n=1 to 8, preferably 1 to 3.

The unsaturated monomers containing N-groups can be e.g. N-dialkyl or N-monoalkyl aminoalkyl(meth)acrylates or the corresponding N-alkanol compounds, e.g. N-diethylaminoethyl methacrylate or N-tert-butyl aminoethyl acrylate, N-dialkyl or N-monoalkyl aminoalkyl(meth) acrylamide or the corresponding N-alkanol compounds such as N-dimethyl-amino- ethanolacrylamide and/or heterocyclic compounds containing vinyl groups and with one or more basic nitrogen atoms, e.g. N-vinyl imidazole.

The term "radically polymerisable hydroxyl group-containing monomers" means e.g. those substances which contain one polymerisable ethylenically unsaturated group and also at least one hydroxyl group on a C$_2$ to C$_{20}$ straight-chain, branched or cyclic carbon skeleton. The main substances are unsaturated esterification products having the general formula:

R—CH=CR'—X—B where

R, R' and X are defined as previously and

B is a straight-chain or branched C$_{1-6}$ alkyl group with 1–3 OH groups.

The following are particularly suitable: (meth)acrylic acid hydroxalkyl esters such as 2-hydroxethyl acrylate, 2-hydroxypropyl methacrylate, butane diol-1,4-monoacrylate, 2,3-dihydroxypropyl methacrylate, pentaerythritol monomethacrylate, polypropylene glycol monoacryalate or fumaric acid dihydroxyalkyl esters. Alternatively use can be made of N-hydroxyalkyl(meth) acrylamide or N-hydroxyalkyl fumaric acid mono-amide or diamide, e.g. N-hydroxymethyl acrylamide or N-(2-hydroxypropyl)methacrylamide. Particularly resilient properties can be obtained by using a reaction product of hydroxyalkyl(meth)acrylate with ε-caprolactone. The following are examples of other compounds containing hydroxyl groups: allyl alcohol, monovinyl ethers of polyalcohols, particularly diols such as the monovinyl ether of ethylene glycol or butane diol, or hydroxyl group- containing allyl ethers or esters such as 2,3-dihydroxypropyl monoallyl ethers, trimethylpropane monoallyl ethers or 2,3-dihydroxypropane acid allyl esters. Hydroxyethyl, hydroxypropyl and/or butane diol-1,4-mono(meth)acrylate are particularly suitable.

The possible additional radically-polymerisable monomers which do not contain other reactive groups are selected in accordance with the mechanical properties of the film and the compatibility of the resin combination used. Use is made of acrylic acid alkyl esters, methacrylic acid alkyl esters, maleic acid and/or fumaric acid dialkyl esters, the alkyl radicals containing 1 to 20 carbon atoms arranged in a straight or branched aliphatic chain or in the form of a cycloaliphatic and/or (alkyl) aromatic radical. "Hard" monomers with a high glass transition temperature when polymerised are vinyl aromatic-type monomers such as styrene, α-substituted styrenes such as α-methyl styrene, o- , m- and p-alkyl styrenes such as vinyl toluene or p-tert- butyl styrene, halogenated vinyl benzenes such as o- or p- chlorostyrene or short-chain methacrylic acid esters such as methyl methacrylate, ethyl methacrylate, propyl methacrylate, butyl methacrylate, cyclohexyl methacrylate, isobornyl methacrylate, dihydrodicyclopentadienyl methacrylate, (meth) acrylamide and/or (meth)acrylonitrile. "Soft" monomers, on the other hand, are e.g. acrylic acid esters with a long alcohol chain, such as n-butyl acrylate, isobutyl acrylate, tert. butyl acrylate, 2-ethylhexyl acrylate and/or lauryl acrylate. Unsaturated ethers such as ethoxymethyl methacrylate or tetrahydrofurfuryl acrylate can also be used. Vinyl ester-type monomers, preferably vinyl ester-α branched monocarboxylic acids, particularly versatic acid vinyl ester, can also be polymerised, if the reaction conditions and reaction comonomers are suitable. The term "ethylenically polyunsaturated monomers" means compounds containing at least two radically polymerisable double bonds and having the general formula:

R—CH=CR'—D—(—CR'=CH—R)$_m$ where m=1 to 3, preferably m=1, R and R' have the meanings given previously, and D is the general chemical supporting basic skeleton for the reactive double bond. The following are examples of D: the m- or p-phenylene radical and radicals having the formula —X—alkylene—X'—, where the alkylene preferably has 2 to 18 carbon atoms and X and X' are the same or different combining groups, e.g. —O—, —CONH—, —COO—, —NHCOO— or —NH—CO—NH—. D can e.g. be a benzene ring as in divinylbenzene, and can also optionally be substituted, e.g. p-methyldivinyl benzene or o-nonyl- divinyl benzene. The following are other examples of suitable polyunsaturated monomers: reaction products of polyalcohols, particularly dialcohols, with α, β-unsaturated carboxylic acids as already defined. The following are examples: ethanediol diacrylate, ethylene glycol dimethyl acrylate, 1,4-butane diol diacrylate, 1,6-hexanediol diacrylate, neopentyl glycol dimethyl acrylate, triethylene glycol dimethacrylate, polyglycol-400-diacrylate, glycerol dimethacrylate, trimethylol propane triacrylate and/or pentaerythritol diacrylate. Polyfunctional monomers containing urethane and amide groups are manufactured e.g. by reacting hexane diisocyanate, methylacrylic acid-β- isocyanato-ethyl ester or dimethyl-m-isopropenyl toluyl isocyanate with hydroxyethyl(meth) acrylate or (meth)acrylic acid. The following are examples of suitable compounds having a different structure: allyl methacrylate, diallyl phthalate, butane diol vinyl ether, divinyl ethylene urea, divinyl propylene urea, maleic acid diallyl ester, biB-maleic imides, glyoxabisacrylic amide and/or the reaction product of epoxy resin and (meth)acrylic ester or fumaric acid semiesters. It is preferred to use difunctional unsaturated monomers such as butane diol diacrylate or hexane diol diacrylate. When glycidyl methacrylate and methacrylic acid are used, the corresponding glycerol dimethacrylate is produced automatically on polymerisation. Similar use can be made of the reaction between incorporated etherified alkoxy(meth)acrylamide and the amide, carboxyl or hydroxyl group. The nature and quantity of polyunsaturated monomers must be carefully adjusted via the reaction conditions (catalysts, reaction temperature, solvent) to obtain the desired high viscosity without gelling. Copolymerisation is brought about in known manner, preferably by solution polymerisation with addition of radical initiators and, optionally, modifiers at temperatures of e.g. 50° to 160° C. The reaction occurs in a liquid in which monomers and polymers dissolve together. The content of monomers or polymers after complete polymerisation is about 50 to 90 wt. %. Preferably, polymerisation in solution is brought about in organic solvents which are water-thinnable, as will be described in detail later. Usually the solvent or solvent mixture is heated to the reaction temperature, after which the monomer mixture is added over a number of hours. In order to operate at reflux temperature, the initiator is adjusted to the boiling temperature of the solvent mixture. Usually it decomposes with a half-life of 30 minutes to 10 hours. The initiator is either dissolved when cold in the monomer mixture or, for safety reasons, is added separately during the addition of the monomer. 0.1 to 5 wt. %, preferably 0.5 to 3 wt. % of peroxides and/or azo compounds relative to the amount of monomers used are added as catalysts soluble in organic solvents. The peroxides used are e.g. benzoyl peroxide or di-tert.butyl peroxide, hydroperoxides such as tert butyl hydroperoxide or cumene hydroperoxide or peresters such as tert.butyl peroctoate or tert.butyl perbenzoate. 2,2'-azo-bis-(2-cyanopropane) or 1,1'-azo-bis- cyclohexane carbonitrile are examples of heat-decomposable azo compounds. The initiators can also be dibenzyl-type radical-forming compounds such as 1,2-bis-(4-methylphenyl) 1,2-dicarbethoxy-1,2-dicyanoethane. The molecular weight can be reduced in known manner by means of modifiers, preferably mercaptans, halogen-containing compounds and other radical-transferring substances. N- or tert.-dodecyl mercaptan, tetrakis-mercaptoacetyl pentaerythritol, tert.-butyl-o-thiocresol, buten-1-ol or dimeric α-methyl styrene are particularly preferred.

Alternatively, amino-poly(meth)acrylate resins in component A) can be manufactured by a reaction similar to polymerisation. For example a copolymer containing an acrylamide group can be reacted with formaldehyde and a secondary amine and/or amino alcohol. An example for a particularly preferred method is described in published German patent application No. 34 36 346. (U.S. Pat. No. 4,857,580). In this method, monoethylenically unsaturated monomers containing epoxy groups are first polymerised in the copolymer. The mixture is then reacted with excess ammonia, primary and/or secondary monoamines and/or monoamino alcohols, after which the excess amine is distilled off. A similar reaction can be carried out, preferably in equivalent quantities, e.g. with ketimines of polyamines containing one secondary amino group and one or more primary amino groups, e.g. the monoketimine of methyl isobutyl ketone and methyl aminopropyl amine or the diketimine of methyl isobutyl ketone and diethylene triamine. The following are examples of radically polymerisable monoethylenically unsaturated monomers containing epoxy groups: mono- and/or diglycidyl compounds of α, β-unsaturated acids, acid amides, alcohols or amines such as glycidesters of (meth)acrylic acid, fumaric acid and/or maleic acid, monoalkyl esters of fumaric acid and/or maleic acid, or glycidyl compounds of (meth)acrylic acid amide, fumaric acid diamide, maleic acid diamide or maleic imide and/or glycidethers of unsaturated alcohols such as vinyl and/or aryl alcohol. Other suitable compounds are monoglycidyl esters of dicarboxylic acid monoesters with unsaturated alcohols such as phthalic acid allyl glycidyl esters. Alternatively, vinyl and allyl esters of epoxidised fatty acids can be used, such as 2,3- epoxybutyric acid allyl ester or epoxystearic acid allyl ester. Use can also be made of diolefins in which one double bond is epoxidised, e.g. vinyl ethylene oxide, 1-methyl-1-vinyl-ethylene oxide or 3,4-epoxy-1-vinyl cyclohexane. Glycidyl acrylate and glycidyl methacrylate are preferred for copolymerisation. The proportion of unsaturated monomers containing epoxy groups in the copolymer is usually 8 to 50 wt. %.. The lower limit is preferably about 12 wt. % and the upper limit about 35 wt. %. Polymerisation needs to be complete before the reaction with amines occurs, since otherwise reversible side-reactions may occur between the secondary amines and the activated double bonds of the monomers. Particularly preferably, the secondary amines for reaction with the epoxy groups have the formula:

R—NH—R' where

R=—H or —R',

R'=—$C_nH_{2n+1}$, —$C_nH_{2n}OH$ and/or —$C_nH_{2n}$—N=C (alkyl)$_2$ and n=1 to 8, preferably 1 to 2 and the alkyl group has 1 to 8 carbon atoms.

The following amines, for example, can be used for the reaction: $C_1$ to $C_6$ dialkylamines with similar or different alkyl groups in the molecule, such as dimethyl, diethyl, diisopropyl, dibutyl, methylethyl, methylpropyl or methylbutyl amine, monocycloaliphatic amines such as morpholine, piperidine, pyrrolidine and/or monoalkanolamines such as N-methylaminoethanol and/or dialkanolamines such as diethanolamine or diisopropanolamine. The primary amines or amino alcohols can e.g. be $C_1$ to $C_8$-alkyl amines such as ethyl amine, 2-ethylhexylamines or aminoethanol. In each case $C_1$ to $C_4$ alkyl groups, particularly $C_1$ and/or $C_2$ alkyl groups, are preferred. Secondary amines such as dimethylamine, diethylamine, methylethylamine or N-methyl- aminoethanol are particularly preferred because they can be used after neutralisation to obtain easily soluble lacquers with high pH. The aforementioned primary amines are generally used mixed with secondary amines, since otherwise the products are too viscous. The number of primary and/or secondary hydroxyl groups is optimised so that when the lacquer is stored, the resulting film is properly cross-linked and resistant to solvents. During the reaction with amine, a secondary OH group is produced from each epoxy group. It is therefore advisable to polymerise at least one additional hydroxyl group per molecule, preferably a primary hydroxyl group via other unsaturated monomers. The number of epoxy groups determines the number of amino groups which are reacted as a result, and consequently also determines the solubility of the products. At least one epoxy group should be present per molecule. It is often advantageous to combine a high hydroxyl number with a low amine number or vice versa. The aim is usually an easily soluble product with a low degree of neutralisation and a maximum pH.

In another preferred method, amino groups are incorporated by reacting a poly(meth)acrylate resin containing hydroxyl groups with amino compounds containing isocyanate groups. These are produced e.g. by reacting 1 mol of diisocyanate with 1 mol of dialkyl aminoalkanol.

In order to reduce the high proportion of solvent which penetrates into the lacquer, the alcoholic solvent of the solution polymer can optionally be distilled off in vacuo at elevated temperatures, after which an emulsion can be produced with acid and water. Another preferred method is solution polymerisation in solvents not soluble in water. This type of resin is emulsified in water after neutralising with acid, after which the solvent is azeotropically removed with water. Emulsion polymerisation is necessary if difficulties with viscosity are to be avoided when obtaining higher molecular weights.

Another preferred group of basic binders (of component A) for base coats are preferably made from polyesters, the amino groups in the form of amino alcohols being either directly condensed into the polyester or, more carefully, incorporated in the polymer chain by polyaddition or suspended from the polymer chain. For example a preferred straight-chain polyester containing OH groups is constructed by reacting the polmer with dialkylamino dialcohols and diisocyanates. If a deficiency of isocyanate is used, the resin must be directly dispersible in water after neutralisation with acid. If on the other hand an excess of isocyanate is used, the resulting NCO prepolymer can be dispersed in water and converted to a polyurethane (urea) dispersion by lengthening the chain with a polyamine.

In the manufacture of polyester urethane resins, the equivalent ratio of the diisocyanate used must be adjusted in accordance with the amount of polyols and diols so that the final polyester urethane resin preferably has a number-average molecular weight (Mn) of 3000 to 200000, particularly preferably below 50000. The viscosity of the polyester urethane resin is preferably about 1 to 30 Pa.s, particularly preferably over 5 and below 15 Pa.s, measured 60% in butoxyethanol at 25° C.

Polyurethane (urea) dispersions Containing basic groups are manufactured in known manner e.g. by lengthening the chain of a cationic prepolymer with terminal isocyanate groups containing polyols, polyamines and/or hydrazine compounds, the chain being lengthened in water with the tert.-amino groups before or after neutralization thereof. The amine number is controlled during manufacture via the quantity of compounds containing cation groups in the prepolymer containing isocyanate groups. The particle size depends on the molecular weight of the polyol used, e.g. OH-polyester (polyester polyol), the amine number and the constructional sequence. The number-average molecular weight is preferably between 3000 and 500000, particularly preferably over 5000 and under 50000. It is preferable to produce polyurethane dispersions containing urea groups and having at least two and preferably four urethane groups and at least one tert.amino group, more particularly a dialkyl amine group in the NCO prepolymer.

Suitable cationic prepolymers containing isocyanate groups for use in polyurethane urea dispersions are manufactured e.g. by simultaneous reaction of a polyol mixture with diisocyanates in a preferred ratio of NCO to OH groups of over 1.00 to 1.4. The polyol mixture preferably consists of one or more saturated OH polymers, optionally with addition of one or more low-molecular diols and a compound having two groups which are H-reactive with regard to isocyanate groups and additionally contain a group capable of forming cations. The reaction occurs at temperatures of 20° to 150° C., preferably 45° to 90° C., optionally with addition of catalysts. Polyaddition is carried out after rapid mixing with vigorous agitation in the melt or aster diluting with dry solvents which do not react with the isocyanate group. The process continues until practically all hydroxyl groups have reacted. On the other hand the reaction can also be brought about stepwise in sequence. For example, the OH polyester first reacts with the diisocyanate, forming soft segments. The remaining amount of isocyanate is then reacted with the compound containing cation groups and optionally with low-molecular dialkanols with addition of additional isocyanate to form a hard segment. The dialkanol and diisocyanate need not be identical with the substance used in the first step.

The polyester polyol can be manufactured in various ways, e.g. in the melt or by azeotropic condensation at temperatures of e.g. 160° to 260° C., preferably from dicarboxylic acid and dialcohols which can optionally be slightly modified with small amounts of trialcohols. The reaction is carried out, optionally with addition of catalysts such as tin octoate or dibutyl tin oxide until practically all the carboxyl groups (acid number$\leq 1$) have reacted. The required OH number of 35 to 200, preferably over 50 and under 150, and the molecular weight of 500 to 5000, preferably over 800 and under 3000, are fixed via the excess of alcohol used. In order to determine the theoretical molecular weight, it is sufficient to determine the OH number, allowing for a functionality of 2 in a straight chain. The number-average molecular weight is then calculated from the formula:

$$Mn = \frac{56100}{OH\ number} \times 2.$$

The preferred dicarboxylic acids are straight-chain or branched aliphatic, elicyclic or aromatic. The two carboxyl groups are preferably disposed so that they cannot form an internal molecular anhydride, i.e. the two carboxyl groups are separated e.g. by a carbon chain of 3 to 14, preferably 4 to 8, carbon atoms. The following are examples: adipic acid, 2,2,4-trimethyl adipic acid, azelaic acid, sebacic acid, 1,3- and 1,4-cyclohexanedicarboxylic acid, 1,4- or 1,3-di- or tetrahydrophthalic acid, isophthalic acid or isophthalic acids and/or terephthalic acid substituted with alkyl groups. The dialkanols are also straight-chain or branched aliphatic or cyclic. Their two OH groups are likewise separated e.g. by a carbon chain containing 3 to 14, preferably 4 to 8 carbon atoms.

Diols with sterically hindered primary OH groups or secondary hydroxyl groups are used for obtaining particularly hydrolysis-resistant polyesters. Examples thereof are butane diol-1,4, hexane diol-1,6, hexane diol-2,5, cyclohexane diol-1,4, 2-ethyl hexane diol-1,3, 2,2,4-trimethylpentane diol-1,3, hydroxypivalic acid neopentyl glycol ester, cyclohexane dimethanol, 2,2-dimethyl-1,3-propane diol, 1,1-isopropylidene-bis-(p-phenoxy)-1-ethanol, 2,2-bis-(hydroxymethyl)-1-butanol, 1,3-di-(hydroxyethyl)-5,5-dimethylhydantoin, or the hydrogenated bisphenols A or F. The dialcohols can contain small quantities of higher polyols such as glycerol or trimethanol propane, in order to bring about branching. The amount however should be small enough to avoid any cross-linked products. A straight-chain aliphatic structure is preferred, optionally containing portions of aromatic dicarboxylic acid and preferably containing an OH group at the end of the molecule.

The polyester polyols according to the invention can also be polyester diols obtained by condensation of hydroxycarboxylic acids. They are characterised by a repeating polyester component having the formula:

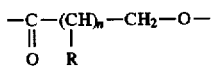

where n=3 to 18, preferably 4 to 6 and the substituent R is hydrogen or an alkyl or cycloalkyl or alkoxy radical. No substituent contains more than 12 carbon atoms. The basic components are hydroxycarboxylic acid, hydroxybutyric acid, hydroxydecanoic acid and/or hydroxy stearic acid.

The lactone used as starting material can be represented by the following general formula:

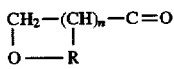

in which n and R have the meaning given previously. Polyester diols are preferably made from unsubstituted ε-caprolactones with n=4 and R=H, started with low-molecular polyols. "Polyesters containing OH groups" include OH-functional carbonic acid esters, which can be produced e.g. by reacting carbonic acid diethyl and/or diphenyl ester with glycols or dialkanols such as 1,6-hexanediol.

In order to influence the molecular distribution and the number of incorporated urethane groups, 2 to 30 wt. % of the higher-molecular polyester can be replaced by low-molecular glycols or dialkanols. For this purpose it is preferable to use the dialkanols already used in the polyester and having a molecular weight of 60 to about 350. The dialkanols used therein need not be identical with those used in the polyester.

In order to dissolve the polyester urethane resin in water, some of the low-molecular diols are replaced by diols which also contain at least one onium salt group or an amino group neutralisable by acid. The basic groups capable of forming cations can be primary, secondary or tertiary amino groups and/or onium groups such as quaternary amino groups, quaternary phosphonium groups and/or tertiary sulphonium groups. Dialkylamino groups are preferably used. They must be sufficiently inert for the isocyanate groups of the diisocyanate to react preferentially with the hydroxyl groups of the molecule.

It is preferred to use aliphatic diols such as N-alkyl dialkanolamines, the alkyl or alkane radical comprising aliphatic or cycloaliphatic radicals containing 1 to 10 carbon atoms. The alkyl group can e.g. be a methyl or ethyl or butyl or cyclohexyl group. The alkanol radical consists e.g. of ethanol, isopropanol, butanol or cyclohexanoi. N- methyl diethanolamine, N-methyl diisopropanolamine or 1,2 propanediol-3-dimethylamine are suitable examples. Alternatively the dialkylamino group can be situated in the side chain of the diol, as e.g. in 2-diethylamino-1,2-propanediol or 2-(dimethylamino-methyl)-2-ethyl-1,3-propanediol When using tertiary amines with more than two hydroxyl groups, e.g. triethanolamine or triisopropanolamine, it is preferable to use a larger content of N-alkyl diethanolamine, to avoid gelling.

Up to 97 wt. % of the total polyol mixture can consist of polyethers or polyesters containing OH groups, preferably saturated OH polymers having a molecular weight of 400 to 5000, preferably over 600 and under 3000. Up to 30 wt. % of the total amount of polyol including the dialkanols modified by cation groups, preferably over 2 and under 20 wt. %, are low-molecular dialkanols having a molecular weight of 60 to about 350. The amount of salts available through neutralisation is usually at least 0.4 wt. % up to about 6 wt. % relative to solid. The isocyanate prepolymer contains 0.2 to 15 wt. % of isocyanate groups relative to non-volatile matter. The amount of dry organic solvent which must not react with isocyanate can vary within wide limits and should be sufficient to form a prepolymer solution having suitable viscosity. If the solvents, which optionally are not water- soluble, have a lower boiling point than water, they can be distilled off under gentle conditions by vacuum distillation or thin-layer evaporation after the polyurethane (urea) dispersion has been produced. The solvents are particularly preferably N-methyl pyrrolidone and/or ketones such as methyl ethyl ketone, methyl isopropyl ketone or acetone and/or esters such as methyl or ethyl acetate.

The cationic groups of the NCO prepolymers used for producing the polyurethane dispersion are at least partly neutralised with an acid. The resulting increase of dispersibility in water is sufficient for any required dilution. It is also sufficient to produce a stable dispersion of the neutralised urea group-containing polyurethane. Organic monocarboxylic acids are suitable. After neutralisation, the NCO prepolymer is diluted with water, resulting in a finely-divided dispersion having an average particle diameter of 25 to 500 nm. Shortly afterwards the remaining isocyanate groups can be reacted with diamines and/or polyamines containing primary and/or secondary amino groups or with hydrazine and its derivatives or dihydrazides for lengthening the chain. This reaction results in further cross-linking and increase in molecular weight. To obtain optimum properties, the competition between amine and water in reacting with the isocyanate is finely adjusted (time, temperature, concentration) and carefully monitored to obtain reproducible production. The chain-lengtheners are preferably organic didmines, because these usually build up the highest molecular weight without gelling the resin. This is possible through suitable choice of the ratio of amino groups to isocyanate groups. The amount of the chain lengthener depends on its functionality, the NCO content of the prepolymer and the duration of the reaction. The ratio of the reactive amino groups in the chain-lengthener to the NCO groups in the prepolymer should usually be lower than 1:1 and preferably in the range between 1:1 and 0.75:1.

The main polyamines are alkylene polyamines containing 1 to 15 carbon atoms. They can carry substituents which do not have any hydrogen atoms which react with isocyanate groups. The following are examples: polyamines with straight or branched aliphatic, cycloaliphatic and/or (alkyl) aromatic structure and at least two primary amino groups. The diamines can e.g. be ethylene didmine, propylene diamine, 1,4-butylene diamine, piperazine, 1,4-cyclohexyl diamine, hexamethylene diamine-1,6, trimethyl- hexamethylene diamine, menthane diamine, isophorone diamine, 1,3 or 1,4-bis-(aminomethyl)cyclohexane, 1-methyl-2,4-diaminocyclohexane, 2-methyl-1,6-hexane diamine, 4,4-diaminodicyclohexylmethane or aminoethyl ethanolamine. The diamines are preferably ethylene diamine, propylene diamine and 1-amino-3-aminomethyl-3, 3,5-trimethyl cyclohexane or mixtures thereof. The chain can be lengthened at least partially by means of a polyamine containing at least three amino groups with reactive hydrogen, e.g. diethylene triamine. The chain-lengtheners can also be diamines in which the primary amino groups are protected in the form of ketimines and which are made reactive by hydrolytic splitting-off of the ketone after emulsifying in water. In addition to hydrazine, the chains are also lengthened with substituted hydrazides such as monoalkyl or monoaryl hydrazide or bis hydrazides such as adipic acid-bis-hydrazide.

In another preferred method of operation, polyaddition is brought about during high dilution with dry solvents which do not react with isocyanate. The chain is lengthened with polyols, polyamines or amino alcohols. The solvents are low-boiling anhydrous ketones such as acetone, methyl ethyl ketone or methyl isopropyl ketone, or esters such as ethyl acetate. After neutralization with acids and dilution with water, the highly volatile solvent must then be distilled off with heating, optionally in vacuo. This method needs to be used when the basic group is a primary amino group which has to be protected by reaction with ketones or aldehydes to form the corresponding Schiff's bases.

Typical diisocyanates for reacting with the polyol/diol mixture are e.g. based on straight-chain or branched aliphatic, cycloaliphatic and/or aromatic hydrocarbons with an NCO content of 20 to 50%. The functional groups therein are two isocyanate groups, asymmetrically or symmetrically disposed in the molecule. They can be aliphatic, alicyclic, aryl aliphatic or aromatic. Their structure can be chosen e.g. in accordance with the desired use made of the coating agent which is to be pigmented. For example isomers or isomer mixtures of organic diisocyanates of toluylene diisocyante can be used for subsequent use in primers. Other examples are 1,4-bis(isocyanato)benzene, 2,4-bis-(isocyanato) toluene, bis-(isocyanato)isododecyl benzene, bis-(2-isocyanato-phenyl)methane, 1,5-bis-(isocyanato) naphthalene, or 4,4'-bis-(isocyanato)-3,3'-dimethyl biphenyl. In the case of coating lacquer systems, it is preferred to use diisocyanates in which the isocyanate group is not bonded to an aromatic carbon atom, because of their good resistance to ultraviolet light. The aliphatic diisocyanate can e.g. be those having the general formula:

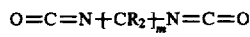

where m is an integer from 2 to 20, more particularly 5 to 8 and R, which can be the same or different, is hydrogen or a lower alkyl radical containing 1 to 8 carbon atoms, preferably a methyl group. Particular preference is given to diisocyanates which have this formula and in which NCO groups are bonded by a $CH_2$ group to a straight-chain, branched or cycloaliphatic, more particularly non-branched straight-chain aliphatic radical. The following are examples thereof: propylene diisocyanate, ethyl ethylene diisocyanate, dimethyl ethylene diisocyanate, methyl trimethylene diisocyanate, trimethyl hexane diisocyanate, 1,12-dodecane diisocyanate, 1,6-bis-(isocyanato)pentane, 1,6- bis-(isocyanato)hexane, 1,6-bis-(isocyanato)-2,2,4-trimethyl hexane, 1,4-bis-(2-isocyanato-ethyl)cyclohexane or 1,3-bis-(2-isocyanato-methyl)cyclohexane. The following are examples of suitable cycloaliphatic diisocyanates: cyclopentylene diisocyanate, 1,4-bis- (isocyanato)cyclohexane, bis-(4-isocyanato- cyclohexyl)methane, 5-isocyanato-3-(isocyanato-methyl)- 1,1,3-trimethyl cyclohexane or methane diisocyanate. The aryl aliphatic diisocyanates can e.g. be 1,3-bis-(1- isocyanato methyl)benzene, 1,4-bis-(1-isocyanato-1- methylethyl)benzene or m-tetramethyl-xylylene diisocyanate. Polyester urethane resins based on 5-isocyanato-3- (isocyanato methyl) -1,1,3-trimethyl cyctohexane (=Desmodur $W^R$), a mixture of varying steric configuration, is particularly preferred. Synthesis is brought about by reaction of the reactants, either combined in a mixture or stepwise to form a sequenced build-up.

Polyisocyanates with more than two isocyanate groups are defunctionalised by reaction with monofunctional compounds which react with isocyanate. Compounds which retain a basic amino group after the reaction are preferred, in order to introduce a salt-forming group. Polyisocyanates are obtained from diisocyanates by trimerisation, reaction with water or partial reaction with trifunctional and higher-functional polyols. Examples thereof are the biuret of hexamethylene diisocyanate and water, the isocyanurate of hexamethylene diisocyanate or isophorone diisocyanate or the adduct of 3 mols of isophorone diisocyanate or m-tetramethyl-xylylene diisocyanate to 1 mol of tetramethanol propane. Basic "diisocyanates" are obtained under gentle conditions by reaction with dialkyl amino alkanols or dialkyl aminoalkyl amines, the alkyl groups being straight or branched, aliphatic or cycloaliphatic with chains containing 1 to 10 carbon atoms. Dimethylaminopropyl amine, diethylaminoethyl amine, diethylaminoethanol or dimethylaminoisopropanol are examples thereof. Useful amino alcohols can also be obtained by Michael addition of hydroxyalkyl (meth)acrylates or hydroxyalkyl(meth)acrylamides with secondary amines.

The aforementioned basic basic-resin binders (component A) can be used either individually or mixed in any desired ratio, preferably between 95:5 and 5:95 by weight. In a special embodiment, the monomers can be polymerised in the basic polyester polyurethane or polyurethane urea, either in solution or in dispersed form. In another method the polyurethane resin can be produced in the unsaturated monomer serving as "solvent", the resin solution can be dispersed and the chain can be optionally lengthened with polyamines, before the monomers are polymerised.

For improved adjustment of the useful properties, e.g. the spray properties or resistance to being dissolved by the clear lacquer, up to 30 wt. % of amine-formaldehyde condensation resins and/or blocked polyisocyanates (component B) optionally also containing amino groups, can be added to the mixture. The preferred quantities are 2 to 25 wt. % relative to the non-volatile content of binders A) and B). Optionally, components A) and B) can be mixed together when cold or pre-condensed at elevated temperature. In the process, components A) and B) can interact to some extent without the mixture losing the property of being made water-dilutable by neutralisation.

During the manufacture of the lacquer, curing catalysts can be added in order to accelerate a reaction between the base lacquer (component A) and the cross-linking agent (component B). When amine-formaldehyde resins are used, the catalysts can e.g. be the amine salts or easily hydrolysable esters of organic sulphonic acids or sulphonamides, which are obtainable commercially. In the event of combination with blocked polyisocyanates it is necessary to use organometallic catalysts such as dibutyl tin dilaurate, optionally in combination with basic catalysts such as 1,4-diazabicyclo[2.2.2]octane.

Preferably the coating agents contain amine-formaldehyde condensation resins, for grinding the pigments and for improving the bite properties. The resins are either soluble in water or can be made water-dilutable by adding organic solvents. They are obtained e.g. by reaction of aldehydes with urea, N-alkyl urea, dicyanodiamide or glycol uril on various triazines such as melamine, benzoguanamine or acetoguanamine or mixtures thereof, followed preferably by complete etherification with low-molecular mono-alcohols. The resulting resins have various molecular weights and reactivity, depending on the reaction conditions (pH, temperature) and the amount of methylolation. The aldehydes are preferably formaldehyde in aqueous and/or alcholic form as the semi-acetate. Paraformaldehyde for example is hydrolysed or depolymerised in the presence of dilute acids or bases in warm water or alcohols. Alternatively other aldehydes such as glyoxal, acetaldehyde, isobutyraldehyde or furfurol can be used. Usually the preferred method is methylolisation with formaldehyde with addition of weak bases. Advantageously 3 to 6 methanol groups per molecule of melamine are reacted. These preferred melamine-formaldehyde resins preferably contain 1–10 cross-linked melamine radicals containing the following functional groups:

Methoxymethylimino:

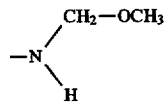

Methoxymethyl-methylolamino:

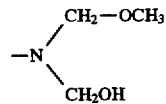

Di(methoxymethyl)amino:

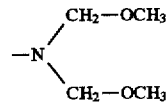

The methylol groups in the aldehyde condensation products are preferably completely reacted with monoalcohols with acid catalysis. Methanol, ethanol, propanol, butanol, heptanol, benzyl alcohol, cyclic alcohols, ethoxy ethanol or butoxy ethanol are particularly preferred. If alcohols with more than 4 carbon atoms have to be incorporated, the methylol group is first etherified with a lower alcohol, after which the higher alcohol is introduced by transetherification. Methanol, butanol and isomers thereof are the preferred alcohols. Melamine resins reacted with 3 to 6 mols of formaldehyde and then completely etherified with methanol, either alone or with (iso)-butanol, are particularly preferred. The resins are produced by prior-art methods and are sold by a number of firms. Etherification with unsaturated alcohols such as hydroxyalkyl(meth)acrylates or allyl alcohol yields unsaturated melamine resins. Use can also be made of carbamyl-methylated melamine resins obtained by reacting alkoxy-methylated melamine resins with alkyl carbamates under weakly acid conditions.

In component B) use is also made, for example, of the previously-described diisocyanates and polyisocyanates, the reactive isocyanate groups being blocked by protective groups. Trivalent and higher-valency, e.g. trivalent to quinquevalent, more particularly trivalent aromatic and/or aliphatic blocked polyisocyanates having a number-average molecular weight Mn of 500 to 1500 are preferably used for this purpose. Particularly good results have been given by "lacquer" polyisocyanates manufactured from the previously-described aliphatic diisocyanates. Another group of polyfunctional isocyanates, oxadiazine trione-alkyl diisocyanates, can be added to trimethylol propane. Higher-functional polyisocyanates can be manufactured by reacting 2 mol of triisocyanates with H-active difunctional compounds such as dialcohols, diamines or aminoalcohols such as ethanolamines or N-methyl diethanolamines.

The free isocyanate groups are masked (blocked) together or individually, so as to protect them at room temperature against water or the active hydrogen atoms of the base resin (hydroxyl or amine-hydrogen groups). The blocking agents can be monofunctional acid hydrogen-containing compounds with only a single amine, amide, imide, lactam, thio or hydroxyl group. Generally use is made of volatile active hydrogen-containing compounds with low molecular weights, preferably not more than 300, advantageously not more than 200. They are reacted with the isocyanate groups, advantageously at temperatures over 50° C., preferably between 80° and 120° C. The blocking agent is used in the proportion of 1 equivalent of blocking agent per NCO equivalent, optionally together with conventional catalysts such as basic catalysts, e.g. tertiary amines or small quantities of tin salts such as tin (II) octoate or dibutyl tin dilaurate. Examples of suitable blocking agents are secondary or tertiary aliphatic or cycloaliphatic alcohols such as isopropanol, tert.-butanol, 2-ethyl hexanol, furfurol, cyclohexanol or hydroxyalkyl ester, dialkylamino alcohols such as dimethylamino ethanol, oximes such as formaldehyde oxime, acetaldehyde oxime, methyl ethyl ketone oxime, cyclohexanone oxime, trimethyl cyclohexanone oxime, 2,2,6,6-tetramethyl piperidone-(4)-oxime, acetophenone oxime, benzophenone oxime or dimethyl glyoxime, lactams such as -caprolactam, -valerolactam, 1-butyrolactam, pyrrolidone-2, hydroxamic acids or esters thereof such as acetohydroxamic acid, benzohydroxamic acid, phenols such as phenol, cresol, tert.-butyl phenol, dimethylaminophenol, N-alkylamides such as methyl acetamide, imidazoles such as 2-methylimidazole, imides such as phthalimide or N-hydroxymaleic imide, or enolising compounds such as malonic acid ester, acetic acid ester or NH-functional enamines. β-hydroxyglycols or glycol ethers and glycol amides are also recommended. Oximes and lactams are particularly important as masking agents, because polyisocyanates masked thereby react at relatively low temperatures. Also, more than one kind of protective group, preferably groups with different reactivity, can be used for blocking. For example a mixture of two or more differently blocked polyisocyanates can be used, or a polyisocyanate blocked with two or more different protective groups.

In the method according to the invention, particular preference is given to blocking agents having the formula:

X—H (19)

in which X stands for

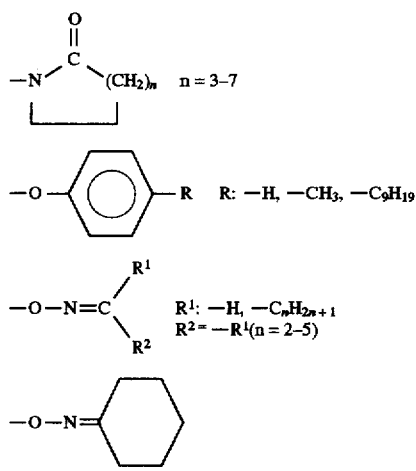

ε-caprolactam, methyl ethyl ketoxime and butoxy ethanol are preferred examples.

In order to carry out the blocking reaction, the isocyanate component is usually prepared first and the other reactant is added. The reaction can be carried out with or without suitable (inert) solvents. Also, mixtures of one or more melamine resins and one or more blocked polyisocyanates can be used. The use of melamine resins is preferred.

The pigments can be pasted in components A) or B). In order to obtain a very highly diluted aqueous dispersion in the case of component A), the pigment is preferably pasted using water-dilutable acrylate or polyurethane wetting resins, which have a powerful wetting effect owing to their amine number, their degree of neutralisation and their high content of polar solvents. In the process about 1 to 15 wt. % of base resin A, relative to dry extract, is exchanged for the wetting resin or paste resin. Advantageously the content of paste resin in the binder mixture is kept at a minimum. The binders preferably have a non-volatile content of 20 to 50 wt. %, preferably have a viscosity of 0.5 to 50 Pa.s at 25° C. and are preferably 70 to 100% neutralised with monocarboxylic acid. Examples thereof are basic polyurethane resins, e.g. basic polyester urethane resins, during the manufacture of which the equivalence ratios of the diisocyanate are chosen in dependence on the polyols and diols so that the finished polyurethane resin, e.g. polyester urethane resin, has a number-average molecular weight Mn of 3000 to 200000, preferably below 50000. The ratio of the OH groups in the polyol, e.g. polyester polyol or diol, to the NCO groups in the isocyanate is preferably between 1.0 and 1.2:1; the viscosity of the polyurethane resin, e.g. polyester urethane resin, is preferably between 1 and 30 Pa.s, and particularly preferably between 5 and 15 Pa.s, measured 60% in butoxyethanol at 25° C.

The most suitable paste resins are those described in the literature and containing onium salt groups.

Resins containing onium salt groups are those containing e.g. quaternary ammonium salt groups, quaternary phosphonium salt groups and/or ternary sulphonium salt groups. They can be produced e.g. by reacting epoxy resins or compounds containing one or more epoxy groups with tertiary amine salts, sulphide/acid mixtures or phosphine/acid mixtures. Conversely, resins containing amino groups can be quaternised by reaction with monoepoxy compounds. The reaction temperature is not particularly critical and is chosen in dependence on the starting substances and their reaction rates. Often the reaction is sufficiently fast at room temperature or elevated temperatures up to 70° C. In many cases it is advisable to use higher temperatures of about 110° C. Usually a solvent is not necessary, although it is often used for better control of the reaction. The solvents may e.g. be aromatic hydrocarbons, monoalkyl ethers of ethylene glycol or propylene glycol or aliphatic alcohols. The acids used are generally those which form corresponding quaternary ammonium salts, sulphonium salts or phosphonium salts. Organic acids with a dissociation constant of more than about $10^{-5}$ are preferred. Formic acid, acetic acid, propionic acid, lactic acid, boric acid and phosphoric acid are suitable examples. Substituted or unsubstituted amines for producing quaternary ammonium salts are suitable if they do not interfere with the reaction between the amine salt and the polyepoxide and do not cause gelling. The following amines are preferred: tertiary trialkylamines such as trimethylamine, triethylamine, triisopropylamine, methyl-di-butylamine, di-ethyl-butylamine or dimethyl aminoethyl or N-methyl-diisopropanolamine.

Resins containing tertiary sulphonium bases can be produced by using any sulphides which react with epoxy groups and do not contain groups which interfere with the reaction. The sulphide can be an aliphatic or mixed aliphatic-aromatic or aralkyl or cyclic sulphide. The following are examples of such sulphides: dialkyl sulphides such as diethyl sulphide, dipropyl sulphide, dibutyl sulphide, dihexyl sulphide or alkyl phenyl sulphides such as diphenyl sulphide or ethyl phenyl sulphide, or alicyclic sulphides such as tetramethylene sulphide, pentamethylene sulphide or hydroxyalkyl sulphides such as diethanol, dipropanol or dibutanol thioethers. The polyepoxide can also be reacted with mercaptans, after which the ternary sulphonium salt can be formed by reaction with 1,2-epoxides in the presence of acid.

Resins containing quaternary phosphonium salt groups can be manufactured using any phosphines which do not contain interfering groups. Examples of such phosphines are aliphatic, aromatic or alicyclic phosphines, the following being given as specific examples: lower trialkyl phosphines such as trimethyl phosphine, methyl diethyl phosphine, triethyl phosphine, tripropyl phosphine, tributyl phosphine, mixed lower alkylphenyl phosphines such as phenyl dimethyl phosphine, phenyl diethyl phosphine, phenyl dipropyl phosphine, diphenyl ethyl phosphine, diphenyl ethyl phosphine, diphenyl propyl phosphine, triphenri phosphine or alicyclic phosphines such as tetramethylene methyl phosphine.

The ratio of tert. amine, sulphide or phosphine to acid is not particularly critical. Preferably at least one equivalent of acid is used for each desired mol for conversion to an onium salt. The ratio between the amine-acid salt, sulphonium salt or phosphonium salt and the epoxy compound can fluctuate. The optimum quantities depend on the specific starting substances. Usually about 1 to about 50 parts by weight of salt can be used per about 100 parts of polyepoxide. In many cases less than 100% of the nitrogen occurs in the form of quaternary ammonium salt groups. This is the case e.g. if primary and secondary amines are used for producing the resins with quaternary ammonium salt groups.

Polymer resins containing onium salt groups can be obtained e.g. by polymerisation of radically polymerisable unsaturated monomers which contain the reactive unsaturated double bond and also a quaternary ammonium group or tertiary sulphonium group or quaternary phosphonium salt group, e.g. the reaction product of glycidyl(meth)acrylate and trialkylamines in the presence of water or acid.

The paste resins can also preferably be poly(meth)acrylate. These are preferably resins which are easily wettable paste binders used in this sector. They are described e.g. in published German patent application No. 36 28 123 (corresponding. to U.S. Pat. No 4,839,414) and are obtained e.g. by reacting A. 80 to 95 wt. % of a copolymer of
1. 0.5 to 40 wt. % of N,N-dialkyl aminoalkyl(meth) acrylamides and/or N-substituted (meth)acrylamides and/or (meth)acrylamide, the ratio of amino(meth) acrylate to amido(meth)acrylates being 1:2 to 2:1,
2. 10 to 40 wt. % hydroxyalkyl(meth)acrylates,
3. 20 to 89.5 wt. % of other copolymerisable$\alpha$, $\beta$-unsaturated compounds, and B. 5 to 20 wt. % of a polyisocyanate, masked or otherwise, containing isocyanate groups and also containing biuret, urethane or isocyanurate groups.

The binders according to the invention are for producing coloured metal decorations and single shades. To this end, transparent or covering pigments are incorporated in usual manner, i.e. the binder is either pigmented directly or produced by mixing pigment pastes with compatible binders, usually in dispersed form. Colouring is obtained by transparent and covering pigments as described in German Standard DIN 55 944. The pigments can be inorganic pigments such as titanium dioxide, carbon black, iron oxides and/or organic pigments such as phthalocyanines, quinacridones and/or halogenated thioindigo pigments, or fillers such as barium sulphate, talc or micaceous silicates. The dispersing units can be disc agitators, three-roll mills, ball mills or preferably sand or pearl mills. The optimum composition of the ground material is obtained by a suitable combination of the main components of the ground material—the pigment, binder and solvent (water)—and is separately determined for each type of dispersion unit. The aim of the dispersion process is substantially to break up lumps of pigment into individual parts, to obtain their full optical activity. The amount of binder in the ground material must be at least sufficient for complete wetting of the pigment. Usually it is advantageous to work at maximum concentration, to reduce to a minimum the amount of paste resin in the subsequent lacquer formulation. The viscosity range in question is fixed so as to obtain complete dispersion in the minimum time. The optimum composition of the ground material is adapted to each respective pigment.

In order adequately to wet the surface of the pigments, it may be advantageous, though not necessary, to mix the ground material with dispersing aids (wetting agents) which are adsorbed by the surface of the pigments and also assist the wetting process by reducing the interface tension between the pigment and the binder. Conventional wetting agents are suitable for this purpose. Metallic or non-metallic decorative pigments such as aluminium-bronze, nacreous or interference pigments are wetted in a separate operation and then stirred into the ground, colour-giving transparent pigment paste. Solubility or dispersibility in water is brought about by salt formation with inorganic acids such as phosphoric acid or acid phosphoric acid esters, boric acid or organic carboxylic acids such as formic acid, acetic acid, propionic acid, acrylic acid, or hydroxycarboxylic acids such as lactic acid, citric acid or dicarboxylic acids such as malonic acid or mixtures thereof. Depending on the state of the solution, there may be a considerable increase in viscosity. Sufficient acid is added for 40 to 110% neutralisation of the amine group. The lower limit is determined by the stability of the dispersion. The pH is 5 to 8 for unibase coats, or preferably 6.5 to 7.5 for metallic base coats. This is usually the case if less than one acid equivalent of the neutralising agent is used per base equivalent of the cationic film former.

In order to control the solubility and the stability in storage, small amounts of organic solvents are added to the lacquer. They are usually water-dilutable. Their evaporation properties are used to influence the surface quality. Examples of such solvents are: ethylene glycol, ethoxyethanol, butoxyethanol, diethylene glycol, triethylene glycol, diethylene glycol dimethyl ether, propylene glycol, methoxypropanol, ethoxypropanol, dipropylene glycol monomethyl ether, dipropylene glycol dimethyl ether, diacetone alcohol, ethanol, isopropanol, N-butanol, sec. butanol, tert. butanol, acetone, methoxypropane, dioxane, tetrahydrofuran, N-methyl pyrrolidone or mixtures thereof. The process can also be improved by adding portions of a non-soluble high-boiling solvent, e.g. saturated hydrocarbons such as benzine fractions, hexylene glycol, phenoxyethanol, isodecanol or 2,2,4-trimethylpentane diol 1,3- monoisobutyrate. The proportion of conventional organic solvents is kept at a minimum, e.g. below 20 or preferably below 10 wt. % in the finished lacquer.

In order to control the rheological properties, associative or microgel-like non-ionic or ionic, preferably cationic thickeners can be incorporated in the lacquer. The non-volatile content of the lacquer is about 30 to 50 wt. % in the unibase coat, and about 15 to 30 wt. % in metallics. The pigment/binder ratio is preferably about 0.3 to 1.2:1 for unibase coats and preferably about 0.05 to 0.5:1 for metallic base coats, by weight in each case. The base lacquer is preferably pseudoplastic or thixotropic, i.e. the apparent viscosity of the dispersion alters with the amount of shearing, i.e. is greater with slight shearing than with strong shearing. The change in viscosity during shearing and the return of viscosity on standing may be delayed.

After coating, the film can be cured with a conventional clear lacquer, either pre-dried or wet-on-wet. When two-component clear lacquers (e.g. acrylic isocyanate and/or polyester isocyanate) are used, particularly advantageous properties with regard to water-tightness, resistance to gravel, adhesion and weathering are obtained even at low curing temperatures. The curing temperatures are e.g. about 60° to 80° C. In the case of a single-component clear lacquer, temperatures below 140° C., particularly 110°–140° C., are preferred.

The base coat and clear coat can be applied in conventional manner, e.g. by painting, spraying, brushing, immersion, pouring or flooding. Spraying is preferred, since this gives the best optical effects. Known spraying methods can be used manually or automatically, e.g. compressed air-spraying, airless spraying, hot spraying or electrostatic spraying.

The layer thickness is preferably about 10 to 30 m of dried film for coatings of base lacquers according to the invention and about 25 to 50 m for the clear lacquer.

It is preferable to use clear lacquers made of thermoplastic or thermosetting film-forming non-yellowing polymers. Preferably the polymers contain anionic groups or groups which can form anionic groups, such as carboxylic groups. The following are examples of binder systems suitable for this purpose: saturated polyesters and/or poly(meth)acrylate resins in combination with amine formaldehyde resins (single-component systems) or with non-yellowing polyisocyanates (two-component systems). Water-dilutable resins can be prepared by neutralising a suitable quantity of carboxyl groups. Conventional pulverulent clear lacquers can be used. They are normally based on the same resin systems but are in solid powder form owing to their glass transition temperature. Clear lacquers usually contain UV stabilisers against light and "quenchers" against radical formation. The use of water-dilutable clear lacquers is preferred, particularly such containing anionic groups or groups which can form anionic groups. Examples of such water soluble clear lacquers are described in published German patent application No. 39 10 829 (U.S. Ser. No. 427,469, Candian Patent No. 2,013,373) Such examples are aqueous systems based on polyester and acrylic resin and mixed with amine resin and neutralising agents, which can contain conventional additives and/or organic solvents.

The binders therein are:

A. 20 to 45 wt. % of an amine resin cross-linking agent (relative to the non-volatile content of the binder) and B. 80 to 55 wt.% (relative to the non-volatile content of the binder) of a polyester oligomer polyacrylate which is soluble in water after neutralising with bases and has a number-average molecular weight (Mn) of 800 to 2000 and is made by radical initiated polymerisation of at least
   a) one hydroxyfunctional(meth)acrylic acid ester and
   b) one monofunctional α, β-ethylenically unsaturated carboxylic acid and
   c) optionally one α, β-ethylenically unsaturated monomer without functional groups, in 20 to 50 wt. % of a hydroxyfunctional polyester oligomer, (the wt. % refer to the amount of monomer components a) plus b) plus c) plus amount of hydroxyfunctional polyester oligomer), obtainable by polycondensation of diols, polyols and dicarboxylic acids or derivatives thereof and having a calculated molecular weight of 200 to 1000, a hydroxyl number of 280 to 600 and an acid number of 0 to 1.5, the monomers a), b) and c) being added in quantities such that the resulting polyester-oligomer polyacrylate has a hydroxyl number of 150 to 390 and an acid number of 16 to 40. Preferably the polyester-oligomer polyacrylates are prepared by radical polymerisation of monomers a), b) and c) in a solution of the polyester-oligomers in a solvent compatible with water or soluble in water. Aliphatic monoalcohols containing 2 to 4 carbon atoms are particularly advantageous water-soluble solvents. The hydroxyfunctional (meth)acrylic acid ester of component B.a) is preferably polypropylene glycol monomethacrylate or 4-hydroxybutyl acrylate.

The base coats according to the invention, particularly after brief pre-drying at 60° to 80° C., can be sprayed without difficulty with solvent-containing or water-dilutable single or two-component clear lacquers or with pulverised clear lacquers and subsequently stoved together for 10 to 60 minutes at temperatures of preferably 110° to 140° C. A lacquer built up with a cationic base coat, particularly at temperatures below the normal stoving conditions for two-component clear lacquer, gives better properties than a lacquer built up on the basis of anionic binders.

The multilayer coatings according to the invention can be applied to electrically non conductive surfaces of various substrates, e.g. plastic substrates. In the case of metal substrates, conventional primers are used, optionally with other intermediate layers such as filler layers. The primers can be of any kind which are applied in conventional manner, e.g. by spraying, or are electrophoretically deposited. The nature of these primers and/or fillers is not critical as regards the subsequent multilayer lacquering process. All conventional materials can be used.

The multilayer lacquers according to the invention can be used in various sectors. They are suitable for small or large apparatus. They are particularly important in the vehicle and vehicle-component lacquering sector. They are usable for lacquering in mass production or for repairs. The multilayer coatings according to the invention can be used to obtain optimum optical properties and excellent hardness and elasticity properties and resistance to water or weathering.

EXAMPLES OF MANUFACTURE

Example 1

(amino-poly(methlacrylate resin)

725 g of butoxyethanol were heated to 110° C. in an inert gas atmosphere, using a reflux condenser. A mixture of 192 g hydroxyethyl acrylate, 137 g butane diol monoacrylate, 228 g glycidyl methacrylate, 364 g 2-ethyl-hexyl acrylate, 439 g butyl methacrylate, 438 g methyl methacrylate, 90 g styrene and 44 g azo-bis isobutyronitrile was added within three hours. The mixture was then kept at 110° C. for one hour, 6 g of azo-bis isobutyronitrile was added and the process was repeated after another hour. After three hours at 110° C. the solids content was 72.2 wt. % and after dilution to 60 wt. % with butoxyethanol the measured viscosity was 2.14 Pa at 25° C. After cooling to 50° C. a mixture of 120 g diethylamine and 201 g isopropynol was rapidly added (1.10 mol amine per 1.00 mol epoxide). After 30 minutes the mixture was heated to 65° C., kept at that temperature for 2 hours, then heated to 105° to 110° C. and kept at that temperature for 3 hours. After cooling to 80° C., isopropanol and excess amine were carefully distilled off in vacuo. The solids content was adjusted to about 78 wt. % with butoxyethanol.

Final Values

Solids content: 78.7 wt. % (30 minutes heating to 150° C.)

Amine number: 45 mg KOH per g solid resin

Viscosity: 3.44 Pa.s (60 wt. % in butoxyethanol at 25° C.).

The resin has stable viscosity in storage and gives non-yellowing smooth surfaces after combination with cross-linking agents.

Example 2

(Polyurethane Dispersion)

912 g of a polyester (made up of adipic acid, isophthalic acid, hexanediol-1,6 and neopentyl glycol with an OH number of 113 and an acid number of 1) in an inert gas atmosphere in a reaction vessel comprising an agitator, inner thermometer, heating and reflux condenser was mixed at about 45° C. with 191 g of methyl diethanolamine and 185 g of N-methyl pyrrolidone. Next, 697 g of isophorone diisocyanate was added and the exothermic reaction was kept at 80° C. by cooling and heating until the NCO number was about 3.3. After adding 185 g of N-methyl pyrrolidone the mixture was cooled to room temperature. 32.6 g of ethylene diamine in 485 g of dry acetone was added within 5 minutes, the temperature rising to 35° C. After 10 minutes a mixture of 152 g completely demineralised water and 63.4 g formic acid (85%) was stirred in, after which an emulsion was made by adding 2026 g of water. The acetone was distilled off by heating to 90° C., optionally in vacuo.

Final Values

Solids content: 42 wt. % (60 minutes heating to 150° C.)

Amine number: 52 mg KOH per g solid resin

MEQ value: about 60 (milliequivalents of acid per g solid resin)

Degree of neutralisation: 75%.

Example 3

(Aqueous Clear Lacquer as per Published German patent application 39 10 829, (U.S. Ser. No. 427, 469, Canadian Patent No. 2,013,373) Example 3)

Manufacture of a Polymer Oligomer 336.7 g of trimethylol propane, 366.8 g adipic acid and 297 g hexane diol were esterified to an acid number of 20 in the melt at 180° C. to 230° C. with 5 g of hypophosphorous acid in a 2-liter three-necked flask provided with an agitator, separator, thermometer and reflux condenser. The mixture was then condensed in vacuo to an acid number of less than 1.5. The resulting product had a stoving residue of 94.5 wt. % (1 h, 150° C.), a viscosity of 3200 mPa.s (100%), a hydroxyl number of 460 and a colour number of 30 Hazen.

Manufacture of Polyester Oligomer Polyacrylates 717 g of the previously-prepared polyester oligomers was reflux-heated at 81° C. with 597 g of ethanol in a 4-liter three-necked flask fitted with an agitator, reflux condenser, dropping funnel and thermometer. Next, a mixture of 552 g butanediol monoacrylate, 996 g tert. butyl acrylate, 74 g acrylic acid and 50 g Vaso 67 (2,2-azo-bis-2- methyl butyronitrile) was added dropwise in 4 hours and polymerised for an additional 4 hours. The product had a stoving residue of 79.8 wt. % (1 h, 150° C.) at a viscosity of 7200 mPa.s (DIN 53015), an acid number of 26.3, an OH number of 231 and a colour number of 60 Hazen.

Manufacture of the water-dilutable clear lacquer 651.2 g of the previously-manufactured polyester-oligomer polyacrylate, 348 g of a commercial high-iminofunctional melamine resin and 152.8 g ethanol were thoroughly mixed and a mixture of 50.7 g butoxyethanol, 20.7 g of benzotriazol- type UV absorber and 13.7 g of a HALS-type radical catcher (HALS =hindered amine light stabiliser) was added with additional agitation. The mixture was then neutralised with 27 g dimethyl ethanolamine with agitation, agitated for a further minute, and then diluted with a mixture of 972.6 g completely demineralised water and 15.4 g ethanol. The lacquer had a viscosity of 31 seconds (measured in the DIN-4 beaker at 20° C.) and a pH of 9.0.

Example 4

555 g titanium dioxide was added to 945 g of aminopoly (meth)acrylate resin as per manufacturing example 1 and dispersed in the dissolver for 5 minutes. The paste was then ground in a pearl mill at temperatures up to 60° C. for 40 minutes.

Solids: 86.6 wt. % (after 30 minutes heating to 150° C.)
Pigment-binder ratio=0.75:1.

72 g of the paste together with 111 g of a melamine resin containing higher-molecular.methoxy-imino groups (80% dissolved in isobutanol) and 17.7 g of an amine-blocked sulphonic acid (25%) catalyst were thoroughly agitated in the dissolver. The mixture was then additionally diluted in the dissolver with vigorous agitation, first with 7.6 g formic acid (85%) and then, slowly with 142 g of completely demineralised water. After standing overnight, 100 g of the lacquer was adjusted with 62 g of completely demineralised water to a spray viscosity of 30 seconds in the flow cup (DIN 53 211) and sprayed on to primed sheet metal, using an automatic spray device.

The base lacquer was pre-dried at 80° C. for 6 minutes and then coated with about 40 m of water and clear lacquer as per manufacturing example 3. The mixture was pre-gelled at 80° C. for 15 minutes, after which the two layers were simultaneously stoved at 120° C. for 20 minutes (under-stove condition).

Example 5

255 g of conventional paste resin (prepared as per published German patent application No. 36 28 123, corresponding to U.S. Pat. No. 4,839,414, Example 4, Table 2) with a solids content of 45 wt. % and a viscosity of 570 mPa,s at 25° C. was mixed with 1185 g titanium dioxide and 167 g butoxyethanol and dispersed in the dissolver for 5 minutes. Next, the paste was ground at temperatures up to 60° C. in the pearl mill for 40 minutes.

Solids: 80.8 wt. % (after 30 minutes heating to 150° C.)
Pigment-binder ratio=10:1

255 g of the paste together with 550 g of polyurethane dispersion (manufacturing example 2) and 78 g of a melamine resin containing higher-molecular methoxy-imino groups (80% dissolved in isobutanol) and 12.4 g of an amine-blocked sulphonic acid (25%) were thoroughly agitated in the Dispermat. The mixture was then additionally diluted with vigorous agitation in the dissolver, first with 0.8 g formic acid (85%) and then slowly with 150 g water. After standing overnight, 100 g of the lacquer was adjusted to the spray viscosity with 15 g completely demineralised water, and used to prepare test sheet-metal as in example 4.

In both example 4 and example 5 the products were hard base-coats resistant to corrosion by water and clear lacquer and with improved elasticity and higher resistance in the condensation chamber than conventional anionic base-coats.

What is claimed is:

1. A process for preparing a multilayer coating on an electrically nonconductive surface of a substrate, the surface optionally having thereon a primer, which comprises
   (A) applying over the optional primer coated surface an aqueous dispersion:
      (1) when said dispersion contains a metallic pigment, the pH of the dispersion is from 6.5 to 7.5 and said dispersion has a nonvolatile content of from 15% to 30% wt., and (2) when said dispersion contains a unibase coat, the pH of the dispersion is from 5 to 8 and said dispersion has a nonvolatile content of from 30 to 50% wt., the dispersion containing a base coat resin of:
         (i) from 70% to 100% wt. based on base coat resin solids of one or more partially or completely acid neutralized cationic polyurethane, and polyurethane-urea resins, having a OH number of up to 450, and an amine number of from 20 to 200, and
         (ii) from 2% to 25% wt. based on base coat resin solids of one or more cross-linking components of (a) an amine-formaldehyde condensation resin, and (b) an amine-formaldehyde in admixture with a blocked polyisocyanate, having at least two groups per molecule being reactive with one or more of amino, OH, urethane, and urea groups in (i),
   the aqueous dispersion further containing one or more of a pigment, a filler, and a lacquer additive, and up to 15% wt. based on the dispersion of an organic solvent for said resin, the ratio of pigment and filler to the resin solids being 0.05–1.2:1;
   (B) applying a clear anionic lacquer coat as an aqueous solution, or in a solution of a lacquer powder in an organic solvent; and (C) curing said base coat and clear anionic lacquer coat together at a temperature below 160° C.

2. The process of clam 1, wherein said dispersion has a pH of from 6.5 to 7.5, and wherein the base coat further comprises a metallic pigment for decorating said multilayer coating.

3. The process of claim 1, wherein the base coat contains one or more opacifying pigments.

4. The process of claim 1, wherein the resin of (i) has a number average molecular weight of from 500 to 500,000, and a glass transition temperature of from −50° C. to +100° C.

5. The process of clam 1, wherein the resin of (i) has a number average molecular weight of from 3,000 to 500,000, and a OH number of upto 50.

6. The process of claim 1, wherein (i) has an amine number of from 30 to 150.

7. The process of claim 1, wherein the clear lacquer is applied over the base coat by spraying, painting, brushing, immersion, or pouring.

8. The process of claim 1, wherein said clear lacquer is an aqueous clear lacquer.

9. The process of claim 1, the substrate is a body part of a motor vehicle, and said multilayer coating is applied as part of a mass production or repair process.

10. The process of claim 1, wherein in component(A)(i) the cationic polyurethane and polyurethane-urea resins are present in a weight ratio of from 5:95 to 95:5.

* * * * *